United States Patent [19]
Kitamura

[11] Patent Number: 6,073,485
[45] Date of Patent: Jun. 13, 2000

[54] SCANNING MICROSCOPE FOR IMAGE TOPOGRAPHY AND SURFACE POTENTIAL

[75] Inventor: Shinichi Kitamura, Saitama, Japan

[73] Assignee: JEOL Ltd., Tokyo, Japan

[21] Appl. No.: 09/113,956

[22] Filed: Jul. 10, 1998

[30] Foreign Application Priority Data

Jul. 11, 1997 [JP] Japan ................................ 9-186441

[51] Int. Cl.[7] .............................................. G01B 7/34
[52] U.S. Cl. ........................................ 73/105; 250/306
[58] Field of Search ............................ 73/105; 250/306

[56] References Cited

U.S. PATENT DOCUMENTS

| | | | |
|---|---|---|---|
| 5,267,471 | 12/1993 | Abraham et al. | 73/105 |
| 5,436,448 | 7/1995 | Hosaka et al. | 250/306 |
| 5,440,121 | 8/1995 | Yasutake et al. | 250/306 |
| 5,519,212 | 5/1996 | Elings et al. | 73/105 X |
| 5,631,410 | 5/1997 | Kitamura | 73/105 |

OTHER PUBLICATIONS

"Kelvin Probe Force Microscopy", Nonnenmacher, O'Boyle and Wickramasinghe, *Appl. Phys. Lett.*, vol. 58, No. 25, Jun. 24, 1991, pp. 2921–2923.

*Primary Examiner*—Daniel S. Larkin
*Attorney, Agent, or Firm*—Webb Ziesenheim Logsdon Orkin & Hanson, P.C.

[57] ABSTRACT

There is disclosed a scanning probe microscope capable of producing a topographic image at a high resolution with a cantilever of a large spring constant and, at the same time, a surface potential image at a high resolution. This microscope can take the form of an atomic force microscope that detects the surface potential of a sample, using a gradient of the force acting between the probe tip and a sample. The gradient is represented by the output from a frequency-to-voltage converter. The frequency of an AC voltage applied across the probe tip and the sample is so set that a z-signal fed back to the cantilever to maintain constant the shift in the resonance frequency of the cantilever can sufficiently follow the AC voltage.

4 Claims, 3 Drawing Sheets

SCANNING MICROSCOPE FOR IMAGE TOPOGRAPHY AND SURFACE POTENTIAL

FIELD OF THE INVENTION

The present invention relates to a scanning probe microscope, typified by an atomic force microscope (AFM), that receives a force from a sample and images both the topography of the surface of the sample and the surface potential.

BACKGROUND OF THE INVENTION

Scanning probe microscopy (SPM) has been heretofore developed that measures a physical force produced between a probe tip and a sample to image both the topography of the sample surface and the potential on the sample surface. FIG. 3 schematically shows an example of an atomic force microscope relying on Kelvin probe microscopy that is one example of such scanning probe microscopy. A cantilever 1 has electrical conductivity and resilience and is coated with a metal, such as gold. A probe tip 2 is attached to the front end of the cantilever 1. A sample to be investigated is indicated by numeral 3. A piezoelectric scanning device 4 controls the position of the sample 3 on the X-axis (horizontal direction as viewed in FIG. 3), on the Y-axis (direction perpendicular to the plane of the sheet), and on the Z-axis (vertical direction as viewed in FIG. 3). A piezoelectric device 5 for applying vibrations is mounted at the rear end of the cantilever 1 that is supported. The cantilever 1 and the piezoelectric device 5 together form a vibration application means. A light source 6 consists of a laser, for example. The instrument further includes a light detector 7, also known as an optical detector, and a preamplifier 8. An oscillator 9 supplies an output signal having an adjusted amplitude to the piezoelectric device 5 to produce vibrations. A lock-in amplifier or RMS-DC amplifier 10 receives the output signal from the oscillator 9 and selects signals corresponding to amplitude variations synchronized to the output signal from the oscillator 9 to produce a topographic image. The instrument further includes a first error amplifier 11, a filter 12, a z-motion piezoelectric element drive power supply 13 forming a distance control and drive means, a first lock-in amplifier 14 for imaging surface potentials, a second lock-in amplifier 15 for imaging a gradient of capacitance between probe tip 2 and sample 3, an oscillator 16 for supplying a reference signal consisting of an alternating voltage of a given frequency $\omega$ to the first and second lock-in amplifiers 14 and 15, respectively, the amplitude of the reference signal being adjusted to a desired level, a second error amplifier 17, and an accumulator 18 for applying a potential representative of the sum of the output signal from the oscillator 16 and the output DC voltage Vdc from the second error amplifier 17 to the cantilever 1. The second error amplifier 17 makes a zero adjustment, i.e., produces the output signal Vdc such that the input from the first lock-in amplifier 14 becomes zero. The second error amplifier 17 includes a filter or other element used to feed the DC voltage Vdc back to the cantilever 1.

This atomic force microscope is a noncontact atomic force microscope in which the probe tip 2 and the sample 3 are opposite to each other and are not in contact with each other. Laser light or other light is emitted from the light source 6 and focused onto the rear surface of the cantilever 1. Light reflected from the rear surface impinges on the light detector 7. The light source 6, the cantilever 1, and the light detector 7 together form an optical lever-type detection system for detecting deflections of the cantilever 1. An atomic force exerted between the tip 2 and the sample 3 deflects the cantilever 1, varying the reflection angle. This, in turn, changes the position on the light detector 7 as the light hits the detector 7 spaced from the cantilever 1. The amount of deflection of the cantilever 1 is detected from the change in this position.

In the atomic force microscope constructed in this way, the output signal from the oscillator 9 is supplied to the piezoelectric device 5. Thus, the cantilever 1 is vibrated at a frequency approximately equal to its resonance frequency. Under this condition, if the tip 2 is brought to a position spaced several nanometers from the sample 3, a physical force gradient produced between the tip 2 and the sample 3 deflects the cantilever 1. This varies the output from the light detector 7. The varied output signal is amplified to an appropriate amplitude by the preamplifier 8 and supplied to the lock-in amplifier 10 for producing a topographic image. This lock-in amplifier 10 compares the frequency of the output signal from the light detector 7 with the frequency components contained in the output signal from the oscillator 9 and produces a signal proportional to the amplitude of the common frequency component to the first error amplifier 11. This amplifier 11 maintains the difference between the output from the lock-in amplifier 10 and a certain voltage set according to a reference voltage V, i.e., the deviation from the resonance frequency. The output signal from the first error amplifier 11 is sent to the z-motion piezoelectric element drive power supply 13 via the filter 12. This power supply 13 provides feedback control of the piezoelectric scanning device 4 by producing a z-signal for controlling the z-coordinate of the sample 3 to control the distance between the tip 2 and the sample 3 according to the output signal from the filter 12.

The filter 12 regulates the operation of the feedback circuit described above. The output signal from the filter 12 creates a topographic image of the surface of the sample 3. A signal representing the topographic image is sent to a display unit (not shown). The tip 2 of the sample 3 is scanned in two dimensions in the X- and Y-directions while maintaining constant the distance between the tip 2 and the sample 3. In this way, a topographic image of the surface of the sample 3 is displayed on the display unit.

The output from the light detector 7 is applied via the preamplifier 8 to the first lock-in amplifier 14 for imaging the surface potential of the sample 3 and to the second lock-in amplifier 15. These lock-in amplifiers 14 and 15 are supplied with the reference signal consisting of an alternating voltage of the given frequency $\omega$ from the oscillator 16. The first lock-in amplifier 14 detects a signal corresponding to the amplitude of the same period (i.e., $\omega$ component) as the given frequency $\omega$ of the reference signal. The second lock-in amplifier 15 detects signals corresponding to twice the period (i.e., $2\omega$ component) of the frequency $\omega$ of the reference signal.

The $\omega$ component detected by the first lock-in amplifier 14 is sent to the second error amplifier 17, which produces the DC voltage Vdc to reduce the $\omega$ component down to zero, i.e., makes a zero adjustment. The DC output voltage from the second error amplifier 17 is fed to the accumulator 18. This accumulator 18 is also supplied with the AC output signal from the oscillator 16 having the same frequency $\omega$ as the reference signal, the amplitude of the AC output being adjusted to a given level by an amplitude adjuster incorporated in the oscillator 16. The accumulator 18 produces the sum of the AC voltage of frequency $\omega$ from the oscillator 16 and the DC voltage Vdc from the second error amplifier 17 to the cantilever 1, thus providing feedback of the voltage.

Application of the AC voltage to the cantilever 1 produces an electrostatic force between the sample 3 and the tip 2 at the front end of the cantilever 1. The sample 3 is at ground potential. The resonance frequency of the cantilever 1 is shifted at the period of the applied AC voltage. The period of this shift is the ω component. If the surface potential of the sample 3 and the potential at the front end of the tip 2 are the same, only the 2ω component is left. Because the DC voltage Vdc is fed back to the cantilever 1, the surface potential of the sample 3 and the potential at the front end of the tip 2 are kept at the same potential. The DC voltage Vdc from the second error amplifier 17 is the surface potential of the sample 3. A surface potential image of the sample 3 is produced on the display device (not shown) by supplying this DC voltage Vdc to the display device.

The signal of the 2ω component detected by the second lock-in amplifier 15 contains information associated with the capacitance between the tip 2 and the sample 3. This signal is imaged on the display device simultaneously with the surface potential.

This example of atomic force microscope uses the so-called Kelvin force probe microscopy (KFM) as a procedure for imaging the surface potential of the sample 3. That is, the electrostatic force is detected directly as a force F, or a deflection of the cantilever 1. The voltage applied to the tip that minimizes the electrostatic force is found. In consequence, the surface potential of the sample 3 with respect to the tip surface is imaged.

The conventional atomic force microscope described already in connection with FIG. 3 and making use of direct detection of the force F must use the cantilever 1 having a small spring constant to ensure detection of the deflections of the cantilever 1. However, reducing the spring constant of the cantilever 1 renders the cantilever 1 more flexible. This creates the danger of the tip 2 at the front end of the cantilever 1 touching the sample 3 and becoming attracted. Therefore, it is impossible to make the distance between the tip 2 and the sample 3 quite small. In consequence, the resolution of the topographic image produced simultaneously with the surface potential image of the sample 3 cannot be improved.

Additionally, the voltage applied across the tip 2 and the sample 3 to detect the surface potential as described above produces an electrostatic force. This electrostatic force increases the distance between the tip 2 and the sample 3. In other words, the tip 2 and the sample 3 are moved away from each other. Consequently, it is not yet possible to produce a topographic image at an atomic resolution by the aforementioned KFM simultaneously with imaging of the surface potential. Accordingly, if the tip 2 and the sample 3 are brought closer to each other by increasing the frequency shift described above, a strong electric field is developed between the tip 2 and the sample 3. This strong field might damage the surface of the sample 3.

On the other hand, in the noncontact atomic force microscopy, a cantilever having a relatively large spring constant has been used as the cantilever 1 in recent years in an ultrahigh vacuum in producing a topographic image of the surface of the sample 3 simultaneously with the surface potential image. This makes it possible to image atoms of the sample 3. Under this condition, if the force F is directly detected as in the prior art technique, the resolution of the surface potential image will deteriorate seriously.

SUMMARY OF THE INVENTION

In view of the foregoing circumstances, the present invention has been made.

It is an object of the present invention to provide a scanning probe microscope which uses either a cantilever of a large spring constant or a needle-type scanning probe microscope having a high resonance frequency to produce a topographic image of a sample surface at a high resolution and which can produce a potential image of the sample surface at an improved resolution. This microscope is further characterized in that if the electrostatic force is increased by increase of the potential difference between the probe tip and the sample, generation of a strong electric field between the tip and the sample is prevented.

To achieve this object, the present invention provides a scanning probe microscope comprising: a probe tip disposed opposite to a sample to be investigated; a vibration application means for supporting and vibrating the tip, the vibration application means and the probe tip constituting a vibration system; a vibration-activating means for causing the vibration application means to vibrate the vibration system at or near a resonance frequency of the vibration system; a frequency-to-voltage converter for converting a change in the vibrational frequency of the tip into a corresponding voltage and producing an output signal indicative of the converted voltage; a first error amplifier for producing an output signal to maintain constant the deviation of the output signal from the frequency-to-voltage converter from a voltage indicative of the resonance frequency; a tip-sample distance control means for controlling the distance between the tip and the sample; a distance control and drive means for feeding a voltage back to the tip-sample distance control means to maintain constant a shift in the resonance frequency of the vibration application means according to the output signal from the first error amplifier; an oscillator for producing a reference signal consisting of an AC voltage of a given frequency which is so set that the voltage fed back can follow the AC voltage; a frequency detection means for detecting components of the same frequency as the reference signal produced from the oscillator from the output signal from the first error amplifier and producing an output signal indicative of the detected components; a second error amplifier for producing a DC voltage to make zero the output signal from the frequency detection means; and an accumulator means for producing the sum of the AC voltage of the reference signal from the oscillator and the DC voltage from the second error amplifier and applying the sum signal across the tip and the sample. A topographic image of a surface of the sample is produced from the output signal from the first error amplifier. The vibration-activating means comprises, for example, a piezoelectric device at the rear of the vibration application means, for example, a cantilever. The vibration-activating means may comprise, for another example, a quartz oscillator at the front end of the vibration application means supporting the probe tip. A surface potential image of the sample is produced from the output signal from the second error amplifier. In one feature of the invention, there is further provided a peak detector which receives the output from the first error amplifier and detects a peak value that minimizes the distance between the tip and the sample. A topographic image of the sample surface is created from the output signal from the peak detector.

Other objects and features of the invention will appear in the course of the description thereof, which follows.

BRIEF DESCRIPTION OF THE DRAWINGS

1 and the output signal (z-signal) from a filter incorporated in the microscope.

DESCRIPTION OF THE PREFERRED EMBODIMENTS

Figure 1:
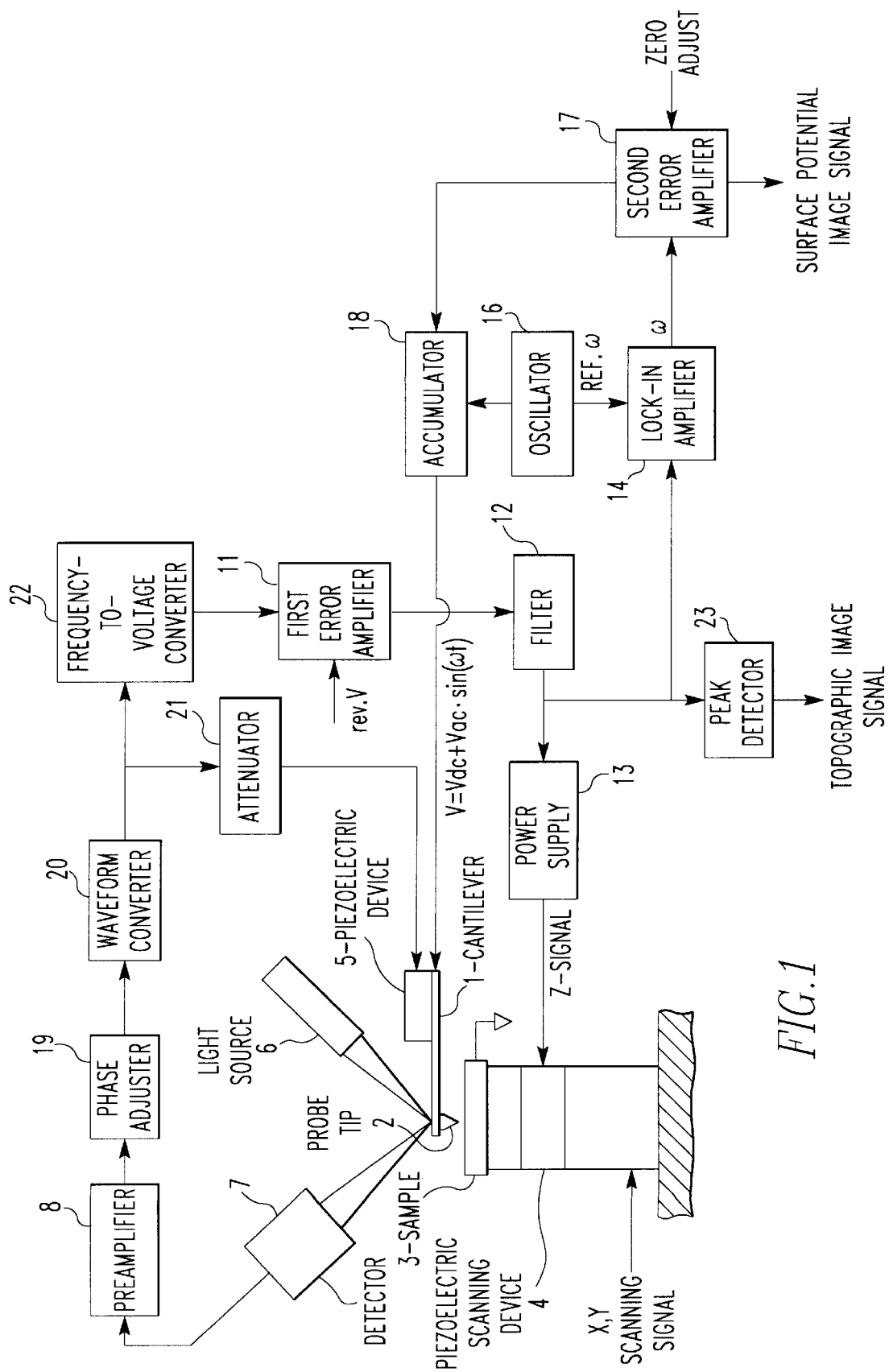
FIG. 1 is a schematic diagram of a scanning probe microscope, in accordance with the present invention.

Referring to FIG. 1, there is shown a scanning probe microscope in accordance with the invention. It is to be noted that like components are indicated by like reference numerals in various figures. This microscope takes the form of an atomic force microscope (AFM). In the prior art atomic force microscope shown in FIG. 3, there are provided the oscillator 9, the lock-in amplifier or RMS-DC amplifier 10, and the second lock-in amplifier 15. In the microscope shown in FIG. 1, the oscillator 9, the lock-in amplifier or RMS-DC amplifier 10, and the second lock-in amplifier 15 are omitted. Instead, the output from the preamplifier 8 is applied to a phase adjuster 19. The output from the phase adjuster 19 is applied to a waveform converter 20. The output from the waveform converter 20 is supplied to an attenuator 21 having an amplitude adjuster and to a frequency-to-voltage converter (PLL) 22. The attenuator 21 represents a vibration application-activating means.

The output from the attenuator 21 is supplied to the piezoelectric device 5 for applying vibrations while the amplitude of the output is adjusted by a built-in amplitude adjuster. The output from the frequency-to-voltage converter 22 is fed to the first error amplifier 11. The output from the filter 12 is supplied to the lock-in amplifier 14 corresponding to the first lock-in amplifier 14 shown in FIG. 3.

A vibration application means comprises the cantilever 1, the piezoelectric device 5, and the detector 7. The vibration application means and the probe tip 2 constitute a vibration system. The vibration application means vibrates the vibration system at or near a resonance frequency of the vibration system.

In this embodiment, the output from the filter 12 produces a topographic image of the surface of the sample 3 in the same way as the foregoing. However, the output signal from the filter 12 has a period (2ω component) half the period of the reference frequency ω. Therefore, if this signal is directly used to create a topographic image, noises of this period will appear. Accordingly, a peak value that minimizes the distance between the tip 2 and the sample 3, i.e., the output signal making the electrostatic force zero, is detected by a peak detector 23, and this output signal is used to create a topographic image.

The given frequency ω of the reference signal from the oscillator 16, i.e., the frequency of the AC voltage Vac*sin (ωt) applied between the tip 2 and the sample 3 from the accumulator 18, is so set that the z-signal fed back to the z-piezoelectric element of the piezoelectric scanning device 4 from the power supply 13 according to the output from the filter 12 can sufficiently follow the AC voltage Vac*sin (ωt). This atomic force microscope is similar in structure to the prior art atomic force microscope shown in FIG. 3 in other respects.

Figure 3:
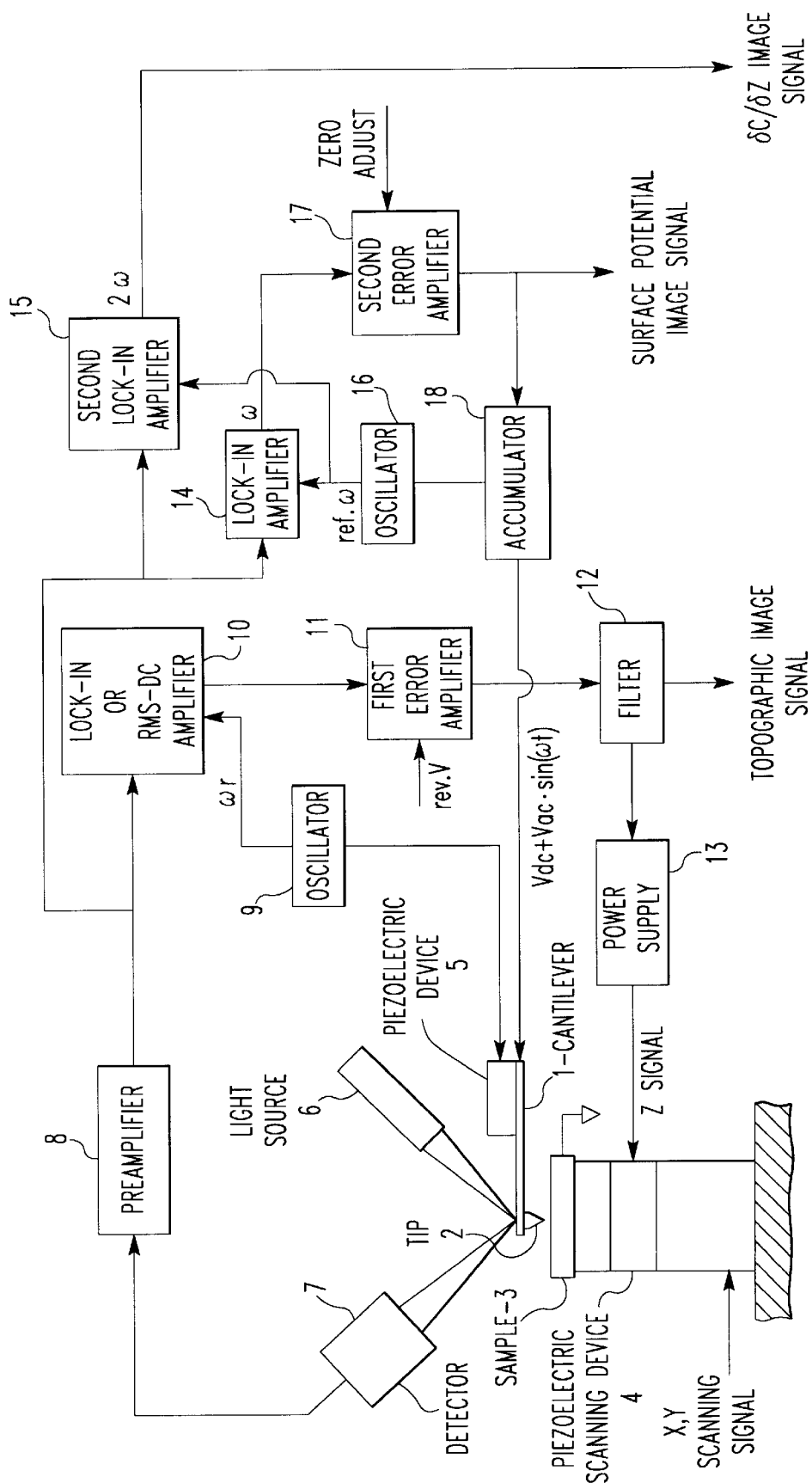
FIG. 3 is a schematic diagram of the prior art scanning probe microscope using KFM (Kelvin probe force microscopy).

In the atomic force microscope constructed in this manner, light from the light source 6 hits the cantilever 1, is reflected by it, and is detected by the light detector 7 in the same way as in the instrument shown in FIG. 3. The output from the light detector 7 is amplified to an appropriate amplitude by the preamplifier 8. The phase of the output from the detector 7 is adjusted by the phase adjuster 19 such that the oscillation system provides a maximum positive feedback to the piezoelectric device 5 for applying vibrations. This oscillation system consists of the piezoelectric device 5, the light detector 7, the preamplifier 8, the phase adjuster 19, the waveform converter 20, and the attenuator 21. Then, the signal is converted into a rectangular wave of a given amplitude (such as power supply voltage) by the waveform converter 20, such as a comparator, to form a reference wave. The gain of the preamplifier 8 is so adjusted that this reference wave is unaffected by unexpected variations in the amplitude of the cantilever 1.

The attenuator 21 sets the amplitude of the voltage applied to the piezoelectric device 5, for example, by division of the reference wave by resistors, so that the vibrating cantilever 1 assumes an appropriate magnitude. The oscillation system constructed as described thus far causes the cantilever 1 to vibrate at its resonance frequency such that the amplitude of vibration is kept constant.

The variations in the frequency of the reference wave from the waveform converter 20 are converted into corresponding voltages by the frequency-to-voltage converter 22. The output from this converter 22 is supplied to the first error amplifier 11 and fed back to the piezoelectric scanning device 4 via the filter 12 and the z-motion piezoelectric element drive power supply 13 in such a way that the deviation from the given voltage set according to the reference voltage V, or the resonance frequency, is kept constant, in the same way as in the AFM shown in FIG. 3. Thus, z-motion of the piezoelectric scanning device 4 is produced. The output from the frequency-to-voltage converter 22 produces the gradient of the force F' (frequency shift) of the cantilever 1. The filter 12 regulates this feedback loop. A topographic image of the sample 3 is created from the output.

Figure 2:
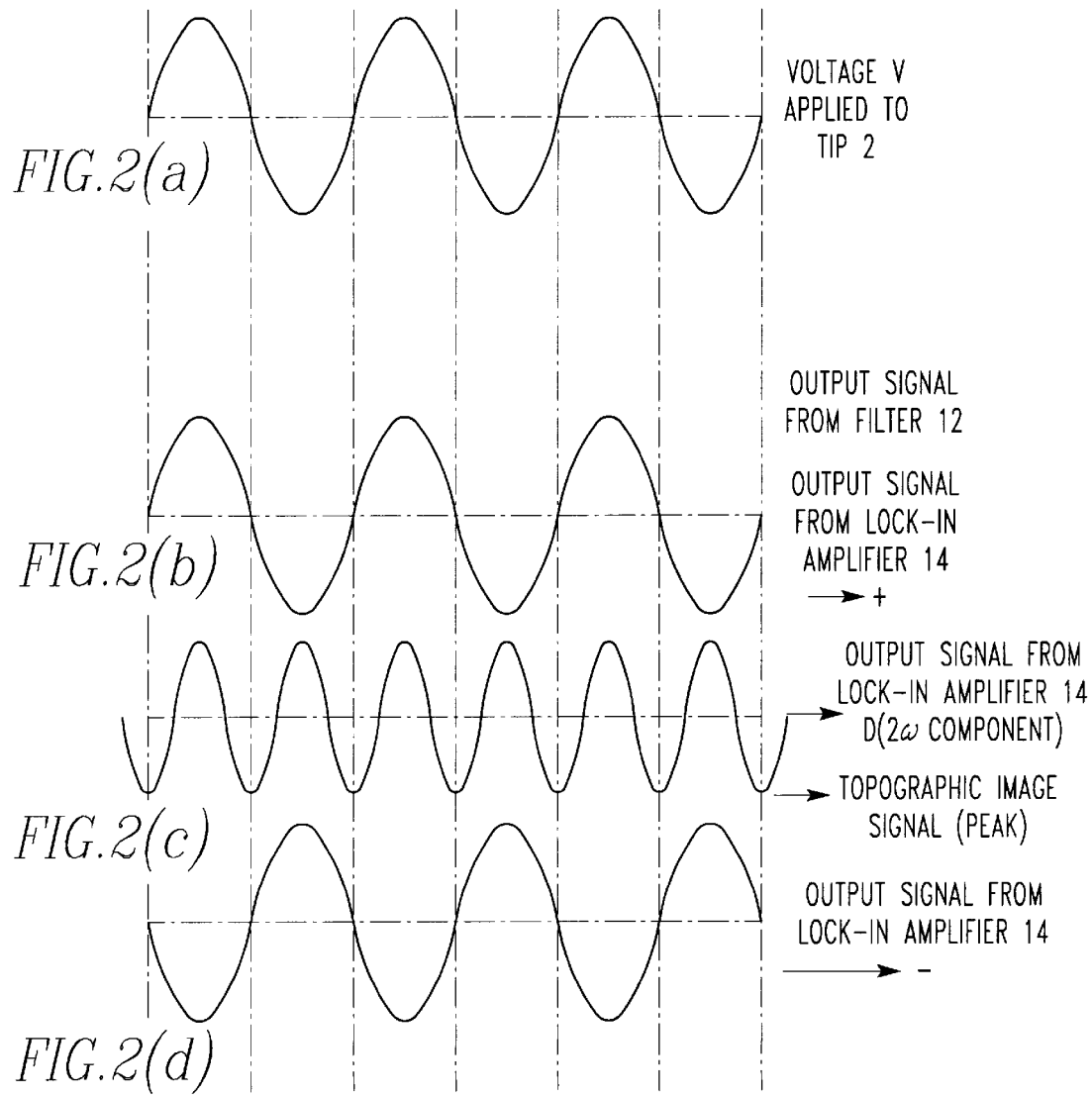
FIGS. 2(a), 2(b), 2(c), and 2(d) are waveform diagrams of a voltage applied to the tip of the microscope shown in FIG.

The portion for producing this topographic image is the noncontacting atomic force microscope using FM detection. The output signal from the filter 12 is fed to the lock-in amplifier 14. This amplifier 14 detects signals of amplitudes having the same period (i.e., the ω component) as the given frequency ω of the reference signal from the oscillator 16. When a signal of the frequency ω component is detected by the lock-in amplifier 14, the output signal from the filter 12 takes a waveform shown in FIG. 2(b) or 2(d). Subsequently, in the same way as in the above-described atomic force microscope shown in FIG. 3, the second error amplifier 17 produces the DC voltage Vdc that makes zero the ω component detected by the lock-in amplifier 14. The accumulator 18 produces the sum of the DC voltage Vdc and the AC voltage having the same frequency as the given frequency ω of the reference signal from the oscillator 16, i.e., Vac*sin (ωt). The sum signal V(=Vdc+Vac*sin (ωt)) from the accumulator 18 is applied to the tip 2 via the cantilever 1 coated with a metal, such as gold. The amplitude of the AC voltage Vac*sin (ωt) from the oscillator 16 is set by the amplitude adjuster incorporated in the oscillator 16. At this time, the voltage V applied to the tip 2 assumes a waveform as shown in FIG. 2(a).

Since the second error amplifier 17 makes a zero adjustment, the topographic image signal from the filter 12 is then produced under the condition that the output from the lock-in amplifier 14 is zero. In this state, the output signal from the filter 12 has a frequency (2ω component) twice the reference frequency ω and takes a form as shown in FIG. 2(c). When the voltage V applied to the tip 2 and the z-signal are at maximum, the tip 2 and the sample 3 are separated by a maximum distance. When the voltage V applied to the tip 2 and the z-signal are at an intermediate level, or at zero level, the tip 2 and the sample 3 are closest to each other.

At this time, the electrostatic force is zero. In particular, the z-signal consisting only of the 2ω component assumes a minimum peak value when the tip 2 and the sample 3 are closest to each other, i.e., the electrostatic force is zero (FIG. 2(c)).

Application of the AC voltage Vac*sin (ωt) to the cantilever 1 produces an electrostatic force between the sample 3 and the tip 2 at the front end of the cantilever 1. The sample 3 is at ground potential. In the prior art instrument shown in FIG. 3, the resonance frequency of the cantilever 1 shifts at the period of the AC voltage applied. In contrast, in this atomic force microscope, no shift is produced for the following reason. The output signal from the filter 12 to the z-motion piezoelectric element drive power supply 13 is detected, the output signal being associated with the z-signal from the power supply 13. The detected signal is used to detect the surface potential of the sample 3. The frequency of the AC voltage Vac*sin (ωt) applied between the tip 2 and the sample 3 is so set that the z-signal fed back to the z-piezoelectric element of the piezoelectric scanning device 4 can sufficiently follow the AC voltage Vac*sin (ωt).

The application of the DC voltage Vdc to the cantilever 1 maintains the surface of the sample 3 and the front end of the tip 2 at the same potential. The DC voltage Vdc developed at this time represents the surface potential of the sample 3 and so a surface potential image is obtained from this DC voltage Vdc.

Since the second error amplifier 17 makes a zero adjustment, the topographic image signal is produced from the filter 12 simultaneously with the detection of the surface potential under the condition that the output from the lock-in amplifier 14 is zero. In this state, the z-signal from the z-motion piezoelectric element drive power supply 13, i.e., the topographic image signal from the filter 12, varies at a period of 2ω. If this signal is used directly as a topographic image, noises with a period half this period will appear. To remove these noises, the peak detector 23 detects the lower peak value of the 2 components of FIG. 2(c) at which the distance between the tip 2 and the sample 3 is shortest and thus the electrostatic force is zero. This is used as a topographic image signal, and this processing is performed by a computer. In this way, noises of ½ period are removed from this topographic image.

In this manner, in the atomic force microscope described above, the frequency of the AC voltage applied across the tip 2 and the sample 3 is so set that the z-signal fed back to maintain constant the shift in the resonance frequency of the cantilever 1 can sufficiently follow the AC voltage. The output signal from the filter 12 that is associated with the z-signal is used to image the surface potential. Therefore, where the potential difference between the tip 2 and the sample 3 increases to thereby increase the electrostatic force, the distance between the tip 2 and the sample 3 increases. Consequently, even if the electrostatic force increases, no strong electric field is set up. The output signal produced from the filter 12 when the distance between the tip 2 and the sample 3 is shortest, i.e., when no electrostatic force is produced, is used as a topographic image signal. Hence, during imaging of the surface potential, the topographic image is produced at the same resolution as the resolution of a normal noncontacting atomic force microscope.

In the embodiment described above, the cantilever 1 acts to hold the probe tip 2. It is to be understood that the present invention is not limited to this structure. The invention can also be applied to a needle-type atomic force microscope in which the probe tip 2 is directly held by a quartz oscillator.

As can be understood from the description provided thus far, in a scanning probe microscope according to this invention, the surface potential of a sample is detected using a gradient of a force that is represented by the output from the frequency-to-voltage converter. Therefore, if either a cantilever having a large spring constant or a needle-type scanning probe microscope having a high resonance frequency is used, the surface potential of the sample is detected. The use of a cantilever having a large spring constant or a needle-type scanning probe microscope having a high resonance frequency improves the resolution of the topographic image of the sample surface up to an atomic level when the topographic image is produced simultaneously with a surface potential image. The frequency of the AC voltage applied across the tip and the sample is so set that the z-signal fed back to maintain constant the shift in the resonance frequency of the vibration application means can sufficiently follow the AC voltage. Therefore, where the potential difference between the tip and the sample increases to thereby increase the electrostatic force, the distance between the tip and the sample increases. Consequently, even if the electrostatic force increases, no strong electric field is set up. This prevents damage to the sample surface.

In a scanning probe microscope according to another embodiment of this invention, the second error amplifier produces a DC voltage that makes zero the output from the frequency detection means. The period of the voltage fed back to the tip-sample distance control means from the distance control and drive means, i.e., the period of the topographic image signal from the first error amplifier, is ½ the period of the given frequency from the oscillator. The peak detector, receiving the output from the first error amplifier, detects the peak value that minimizes the distance between the probe tip and the sample. This peak value appears when no electrostatic force is produced. The detected peak value is used directly as a topographic image signal. This removes noises of ½ period when signals of ½ period are directly used as a topographic image signal. In consequence, the resolution of the topographic image is improved further.

Having thus described my invention with the detail and particularity required by the Patent Laws, which is desired protected by Letters Patent is set forth in the following claims.

What is claimed is:

1. A scanning probe microscope comprising:
    a probe tip disposed opposite to a sample to be investigated;
    a vibration application means for supporting and vibrating said tip, said vibration application means and said probe tip constituting a vibration system;
    a vibration-activating means for causing said vibration application means to vibrate said vibration system at or near a resonance frequency of said vibration system;
    a frequency-to-voltage converter for converting a change in the vibrational frequency of said tip into a corresponding voltage and producing an output signal indicative of said converted voltage;
    a first error amplifier for producing an output signal to maintain constant the deviation of the output signal from said frequency-to-voltage converter from a voltage indicative of said resonance frequency;
    a tip-sample distance control means for controlling the distance between said tip and said sample;
    a distance control and drive means for feeding a voltage back to said tip-sample distance control means to maintain constant a shift in the resonance frequency of said vibration application means according to the output signal from said first error amplifier;

an oscillator for producing a reference signal consisting of an AC voltage of a given frequency which is so set that the voltage fed back can follow the AC voltage;

a frequency detection means for detecting components of the same frequency as the reference signal produced from said oscillator from the output signal from said first error amplifier and producing an output signal indicative of the detected components;

a second error amplifier for producing a DC voltage to make zero the output signal from said frequency detection means; and an accumulator means for producing the sum of the AC voltage of the reference signal from said oscillator and the DC voltage from said second error amplifier and applying the sum signal across said tip and said sample, whereby a topographic image of a surface of said sample is produced from the output signal from said first error amplifier and a surface potential image of said sample is produced from the output signal from said second error amplifier.

2. The scanning probe microscope of claim 1, wherein there is further provided a peak detector which receives the output from said first error amplifier and detects a peak value that minimizes the distance between said tip and said sample, and wherein a topographic image of said sample surface is created from the output signal from said peak detector.

3. The scanning probe microscope of claim 1 or 2, wherein:
(A) said vibration application means comprises a cantilever holding said tip at the cantilever's front end, a piezoelectric device held at the rear end of said cantilever and acting to vibrate said cantilever, and a detector for detecting deflections of said cantilever and producing an output frequency indicative of the detected deflections;
(B) said piezoelectric device vibrates said cantilever at the cantilever's resonance frequency; and
(C) said frequency-to-voltage converter converts the output frequency from said detector into a voltage.

4. The scanning probe microscope of claim 1 or 2, wherein:
(A) said vibration application means has a quartz oscillator at the front end of the vibration application means;
(B) said quartz oscillator has a resonance frequency, supports said tip, and vibrates said tip at a vibrational frequency;
(C) said quartz oscillator is vibrated at the resonance frequency of the quartz oscillator; and
(D) said frequency-to-voltage converter converts the vibrational frequency of said quartz oscillator into a voltage.

* * * * *